United States Patent [19]
Kado et al.

[11] Patent Number: 5,497,656
[45] Date of Patent: Mar. 12, 1996

[54] METHOD OF MEASURING A SURFACE PROFILE USING AN ATOMIC FORCE MICROSCOPE

[75] Inventors: Hiroyuki Kado, Osaka; Takao Tohda, Ikoma, both of Japan

[73] Assignee: Matsushita Electric Industrial Co., Ltd., Osaka, Japan

[21] Appl. No.: 393,029

[22] Filed: Feb. 23, 1995

Related U.S. Application Data

[62] Division of Ser. No. 8,483, Jan. 25, 1993, abandoned.

[30] Foreign Application Priority Data

Jul. 24, 1992 [JP] Japan .................................. 4-198593

[51] Int. Cl.⁶ .................................................. G01B 7/34
[52] U.S. Cl. ........................................ 73/105; 250/307
[58] Field of Search ............................ 73/105; 250/306, 250/307

[56] References Cited

U.S. PATENT DOCUMENTS

| | | | |
|---|---|---|---|
| Re. 33,387 | 10/1990 | Binnig | 250/306 |
| 4,889,988 | 12/1989 | Elings et al. | 250/306 |
| 4,902,892 | 2/1990 | Okayama et al. | 250/307 |
| 4,954,704 | 9/1990 | Elings et al. | 250/307 |
| 5,144,128 | 9/1992 | Hasegawa et al. | 250/306 |
| 5,162,653 | 11/1992 | Hosaka et al. | 250/306 |
| 5,166,516 | 11/1992 | Kajimura | 250/234 |
| 5,245,863 | 9/1993 | Kajimura et al. | 73/105 |
| 5,267,471 | 12/1993 | Abraham et al. | 73/105 |
| 5,289,004 | 2/1994 | Okada et al. | 250/306 |
| 5,336,887 | 8/1994 | Yagi et al. | 250/306 |
| 5,412,980 | 5/1995 | Elings et al. | 73/105 |
| 5,415,027 | 5/1995 | Elings et al. | 73/105 |

FOREIGN PATENT DOCUMENTS

| | | |
|---|---|---|
| 0347739A2 | 12/1989 | European Pat. Off. . |
| 0437275A2 | 7/1991 | European Pat. Off. . |
| 0472342A2 | 2/1992 | European Pat. Off. . |
| 2-5340 | 1/1990 | Japan . |

OTHER PUBLICATIONS

"The influence of lateral forces in scanning force microscopy", Rev. Sci. Instrum. 62(1), Jan. 1991, A. J. den Boef, 1990 American Institute of Physics, pp. 88–92.

*Primary Examiner*—Thomas P. Noland
*Attorney, Agent, or Firm*—Wenderoth, Lind & Ponack

[57] ABSTRACT

An atomic force microscope is preferably used to observe a sample surface and measure a surface profile of a sample by making use of interatomic forces existing between a probing tip and the sample surface. The atomic force microscope includes a cantilever having a probing tip, a laser diode for emitting a laser beam, a lens for focusing the laser beam emitted from the laser diode on the cantilever, and a photodiode for detecting a light beam reflected from the cantilever to thereby detect the amount of deflection of the cantilever. The atomic force microscope further includes a mechanism for finely moving one of a sample and the cantilever in three different directions, and a controller or computer for controlling the mechanism and for imaging the sample surface based on the amount of deflection of the cantilever at a plurality of locations of the sample surface. By this construction, after measurement of the sample surface at a first location thereof, the sample is moved away from the probing tip by a given length and is further moved relative to the probing tip so that the probing tip is positioned above a second location of the sample. Thereafter, the sample is further moved towards the probing tip at the second location by a length substantially equal to the given length. The movement of the sample is repeated until measurements of the sample surface at the plurality of locations thereof are completed.

10 Claims, 4 Drawing Sheets

METHOD OF MEASURING A SURFACE PROFILE USING AN ATOMIC FORCE MICROSCOPE

This application is a divisional of now abandoned application Ser. No. 08/008,483, filed Jan. 25, 1993.

BACKGROUND OF THE INVENTION

1. Field of the Invention

The present invention relates to a method of measuring a surface profile using an atomic force microscope for observing a sample surface by making use of interatomic forces existing between a probing tip and the sample surface.

2. Description of the Prior Art

Recently, development has proceeded on an atomic force microscope (hereinafter referred to simply as an AFM) which is used as an instrument capable of observing the surface of a solid body on an atomic scale.

The principle of the AFM is explained hereinafter with reference to FIG. 5.

In order to detect minute forces, a cantilever 6 having a probing tip 12 and a length ranging from 100 μm to 200 μm is preferably employed in the AFM. When a sample 21 placed on a sample platform 4 is brought near the probing tip 12, the cantilever 6 deflects in the presence of interatomic forces existing between the probing tip 12 and the sample 21. The AFM scans the surface of the sample 21 using first and second piezoelectric members 1 and 2 and a piezoelectric member drive unit 11 while a third piezoelectric member 3 is being feed-back controlled by the piezoelectric member drive unit 11 via a control signal generator 14 so that the amount of deflection of the cantilever 6 may be maintained constant. The first, second, and third piezoelectric members 1, 2, and 3 are secured to and extend from the sample platform 4 in directions shown by arrows X, Y, and Z, respectively. Because the control quantity in such a feed-back control is indicative of height variations of the sample surface, an AFM image is obtained by converting the control quantity into image information using a controller or computer 10. Alternatively, the AFM image can be obtained by converting the amount of deflection of the cantilever 6 into image information without performing the feed-back control. The amount of deflection of the cantilever 6 is detected by a deflection detector 22 wherein the principle of optical beam deflection, laser interference, tunnel current, or the like is utilized. The resolution of the AFM depends upon the radius of curvature of the probing tip 12. The less the radius of curvature, the higher the resolution At present, an atomic image of, for example, mica is observed by a probing tip having a radius of curvature of several hundred angstroms. The AFM is used to observe not only a sample surface on an atomic scale but also another sample surface having relatively large height variations in unit of nanometers (nm) or micrometers (μm). The observation of the sample surface of the latter, for example, a grating having relatively deep grooves, requires a probing tip having a small radius of curvature and a high aspect ratio sufficient to reach the bottoms of the grooves. In this respect, a whisker crystal is preferably used as the probing tip.

As a matter of course, in applications where the probing tip 12 is scanned on the surface of the sample 21, the cantilever 6 deflects in the presence of height variations of the sample surface. In addition to such deflection, variations in the friction coefficient of the sample surface or a distortion of the cantilever 6 causes a deflection of the cantilever 6. This kind of deflection brings about noise, and hence, accurate measurement of the surface configuration cannot be expected. By way of example, when mica is used as a sample and a repulsive force of $1 \times 10^{-8}$N is chosen to act on the cantilever 6, an AFM image obtained from the amount of deflection of the cantilever 6 indicates a generally symmetric atomic image. On the other hand, when a repulsive force of $1 \times 10^{-7}$N is chosen to act on the cantilever 6, the AFM image indicates a non-symmetric atomic image.

Furthermore, in applications where measurements are carried out using a probing tip having a high aspect ratio, and if the sample 21 contains very steep height variations or has grooves with generally vertically extending side walls, a side surface of the probing tip 12 occasionally collides against the side walls of the grooves during scanning. Under such conditions, little deflection of the cantilever 6 would occur, and hence, the scanning is continued with the distance between the sample and the probing tip 12 maintained substantially constant. As a result, not only can no accurate AFM image be obtained, but also the probing tip 12 or the cantilever 6 is occasionally damaged.

In addition, if the sample 21 is a living body which cannot be easily anchored on a substrate, the scanning of the probing tip 12 drags the sample 21 on the substrate, thus resulting in an inaccurate measurement.

SUMMARY OF THE INVENTION

The present invention has been developed to overcome the above-described disadvantages.

It is accordingly an object of the present invention to provide a method of measuring a surface profile using an improved atomic force microscope capable of accurately observing the surface of a sample irrespective of the configuration or the type of the sample.

The above-noted object may be effected by providing a method of measuring a surface profile of a sample using an atomic force microscope which observes a sample surface by making use of forces acting between a probing tip formed on a free end of a cantilever and the sample surface when the probing tip is brought into contact with the sample surface, said method comprising the steps of (a) positioning the probing tip above one location of the sample surface; (b) moving one of the cantilever and the sample surface towards the other by a constant given distance so that the probing tip is brought into contact with the sample surface, said constant given distance being determined in advance so as to be greater than a maximum value of height variations of the sample surface within a range thereof to be measured; (c) measuring a height of the sample surface with the probing tip held in contact with the sample surface; (d) imaging said height measured at step (c); (e) moving said one of the cantilever and the sample surface away from the other by said given distance so that the probing tip is spaced apart from the sample surface; (f) moving said one of the cantilever and the sample surface relative to the other so that the probing tip is positioned above a next adjacent location of the sample surface spaced apart from said one location; (g) repeating said steps (b) to (f) at a plurality of succeeding locations of the sample surface so as to image the height variations of the sample surface.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
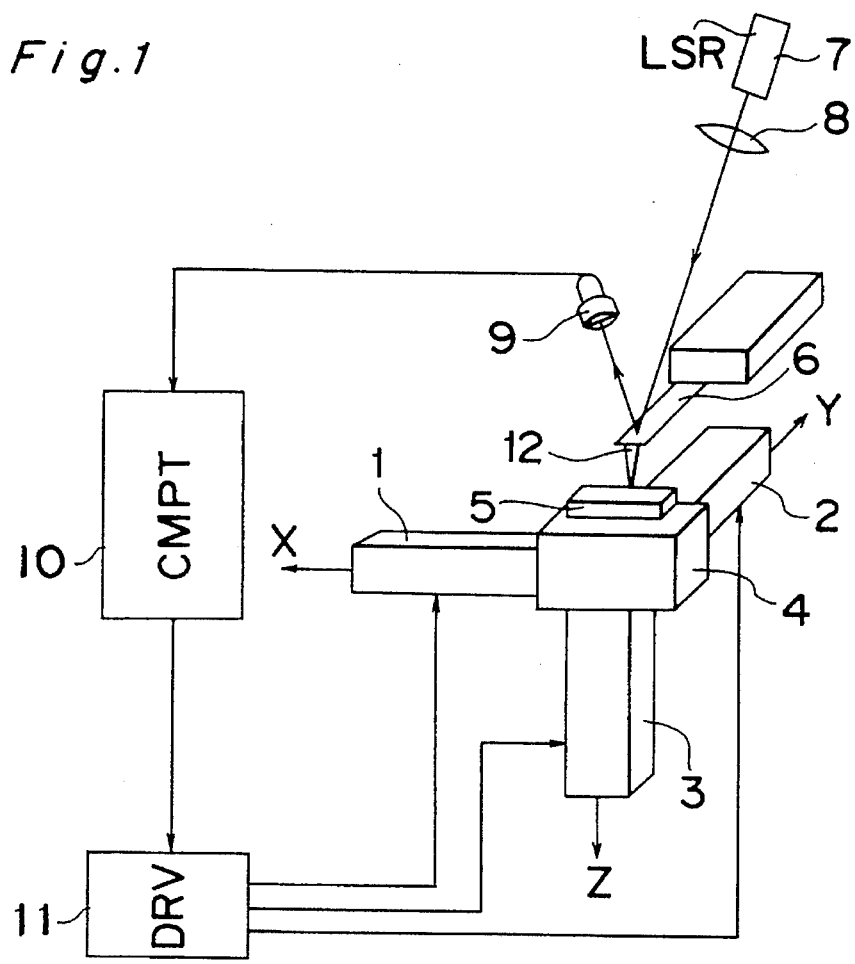
FIG. 1 is a schematic diagram of an atomic force microscope according to a first or second embodiment of the present invention.

Referring now to the drawings, there is schematically shown in FIG. 1 an AFM according to a first embodiment of the present invention. This AFM comprises a finely movable mechanism in the form of a tripod, a cantilever 6 disposed in the proximity of the finely movable mechanism, and a probing tip 12 secured to or otherwise integrally formed with a free end of the cantilever 6. The finely movable mechanism comprises a sample platform 4 on which a sample 5 is to be placed, and first, second, and third piezoelectric members 1, 2, and 3 secured to and extending from the sample platform 4 in directions shown by arrows X, Y, and Z, respectively.

The sample 5 is scanned horizontally by applying voltages generated by a piezoelectric member drive unit 11 to the first and second piezoelectric member 1 and 2, respectively. The deflection of the cantilever 6 caused by interatomic forces existing between the sample 5 and the probing tip 12 is detected by making use of the principle of optical beam deflection wherein a laser beam emitted from a laser diode 7 having an output of 5 mW is initially focused on the cantilever 6 by a lens 8, and a reflected light beam is detected by a two-segment photodiode 9.

A specific control method is explained hereinafter which was used to observe a cleavage surface of mica.

Mica 5 was initially placed, as a sample, on the sample platform 4 such that a central portion of the former might be positioned below the probing tip 12. Prior to measurement of this sample, the AFM was set so that the cantilever 6 might first receive a repulsive force of $1\times10^{-7}$N.

Figure 2:
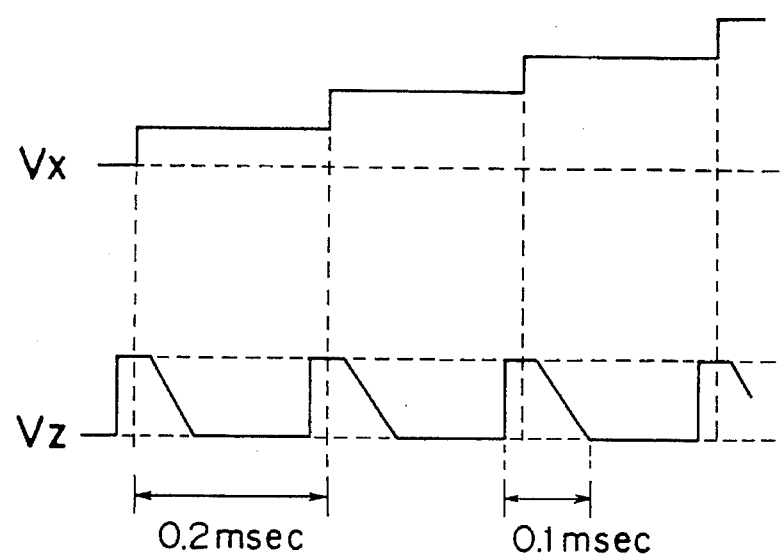
FIG. 2 is a timing chart of voltages applied to two piezoelectric members extending in different directions.

FIG. 2 is a timing chart indicating how to apply, after the setting, voltages to the first and third piezoelectric members 1 and 3, respectively. After the amount of deflection of the cantilever 6 was detected by the optical beam deflection, a step voltage Vz was applied to the third piezoelectric member 3 to move the sample 5 1 nm away from the probing tip 12. The sample 5 was then horizontally moved 2 Å by the first piezoelectric member 1 using the piezoelectric member drive unit 11. Thereafter, the voltage applied to the third piezoelectric member 3 was gradually reduced so that the sample 5 might be moved 1 nm towards the probing tip 12, and the amount of deflection of the cantilever 6 was stored in a controller or computer 10. Height variation or undulation information at various points of the sample surface was derived from the amount of deflection of the cantilever 6. The time period required for the movement from one point to another was set to 0.2 millisecond, whereas that required for moving the sample 5 away from the probing tip 12 was set to 0.1 millisecond. Such measurements were repeated 256 times in the direction of X until the scanning for one line was terminated. Thereafter, the sample 5 was horizontally moved 2 Å by the second piezoelectric member 2, and similar operations were carried out with respect thereto to complete the next succeeding line scanning. Upon completion of 256 line scannings, (256×256) pieces of undulation information were derived from the sample surface. An AFM image obtained from such information indicated an accurate and symmetric atomic image.

The above-described operations of the AFM could reduce the noise level as compared with the conventional case wherein the cantilever continuously scanned the sample surface with a constant repulsive force being applied thereto. Even if measurements were carried out under the influence of a relatively strong repulsive force of $1\times10^{-7}$N or more, an image obtained indicated a high resolution. One reason for this is deemed to be that a torsional component of the cantilever, which might arise when the sample was scanned in the direction of X, brought about no noise.

In the above-described embodiment, although the measurements required to obtain the undulation information were carried out only once for each point, such measurements may be repeated a plural number of times for each point. It was confirmed that an image obtained by the use of an average value of the repeated measurements included lower noise.

Furthermore, a method employing laser interference or a tunnel current can be effectively utilized as a means for measuring the amount of deflection of the cantilever in place of the method employing the optical beam deflection. It was also confirmed that similar results could be obtained by the use of the former method.

A second embodiment of the present invention is discussed hereinafter wherein an Au film prepared by a sputtering process was observed by the AFM. The construction of the AFM according to the second embodiment is the same as that of the AFM according to the first embodiment discussed above.

A sample 5 having an Au thin film on an Si substrate was initially placed on the sample platform 4 such that a central portion of the sample 5 might be positioned below the probing tip 12. Then, a voltage was gradually applied to the third piezoelectric member 3 by the computer 10 via the piezoelectric member drive unit 11 so that the sample 5 might be brought near the probing tip 12. At this moment, the force acting on the cantilever 6 from the sample 5 was measured by the two-segment photodiode 9. When the cantilever 6 received a repulsive force of a given magnitude, the sample 5 was stopped by the computer 10 from approaching the probing tip 12, and the voltage applied to the third piezoelectric member 3 was stored in the computer 10. Undulation information at each point on the substrate surface was derived from this voltage. In measuring the sample 5, the magnitude of the repulsive force was set to $1\times10^{-8}$N. Thereafter, the sample 5 was moved away from the probing tip 12 until no force acted on the cantilever 6 from the sample 5. The sample 5 was then moved 2 nm leftwards by the first piezoelectric member 1 using piezoelectric member drive unit 11. Thereafter, a voltage was gradually applied to the third piezoelectric member 3 to make the sample 5 approach the probing tip 12 until the cantilever 6 received a repulsive force of $1\times10^{-8}$N. The voltage applied to the third piezoelectric member 3 at this moment was stored in the computer 10. Then, the sample 5 was further moved 2 nm leftwards by the first piezoelectric member 1. Such measurements were repeated 256 times in the direction of X until the scanning for one line was terminated. Thereafter, the sample 5 was moved 2 nm downwards by the second piezoelectric member 2, and similar operations were performed with respect thereto to complete the next succeeding line scanning. Upon completion of 256 line scannings, (256×256) pieces of undulation information were obtained from the sample surface.

The above-described operations of the AFM could reduce the noise level and could provide an image having a high resolution, as compared with the conventional case wherein the cantilever continuously scanned the sample surface with a constant repulsive force acting thereon.

Figure 3:
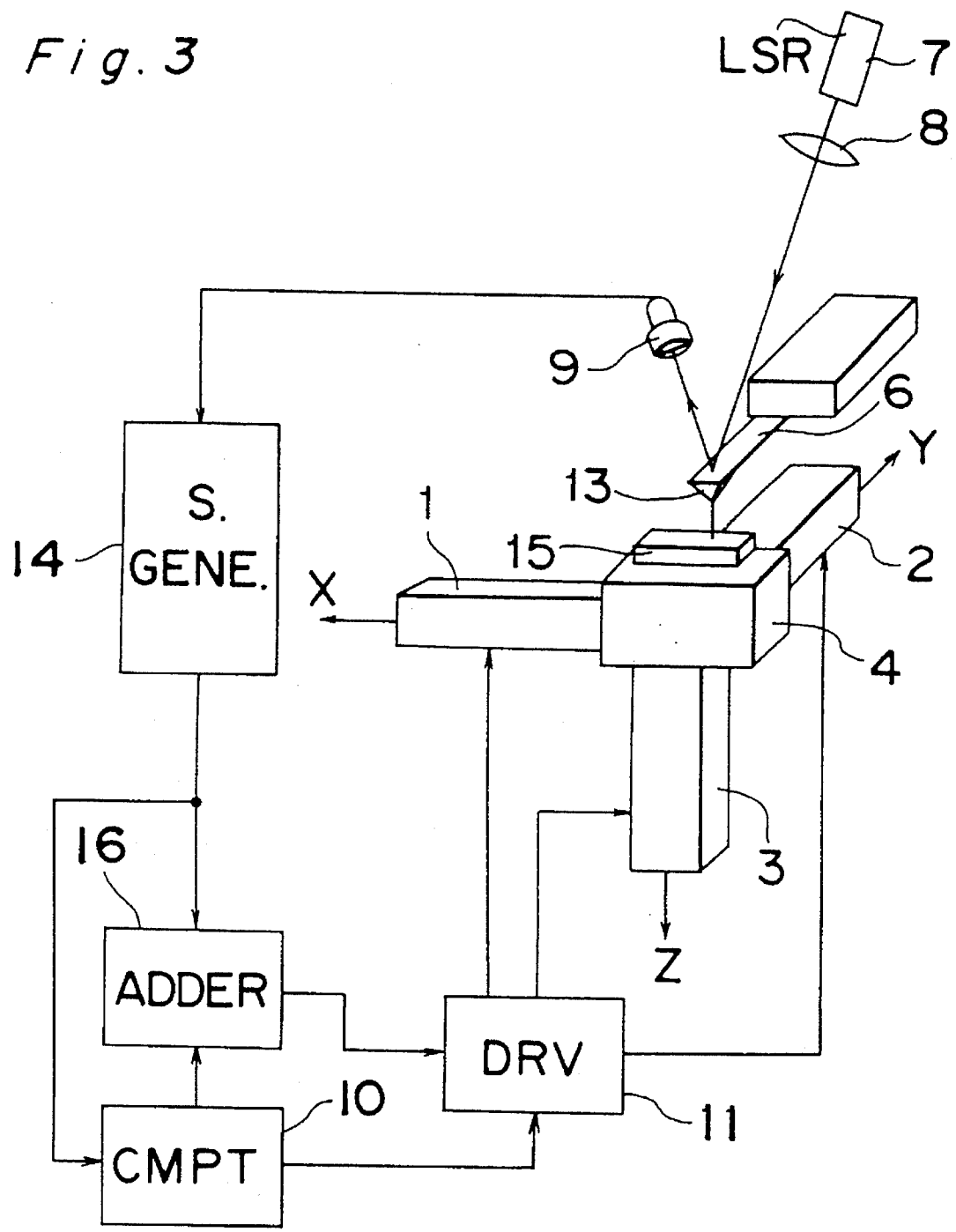
FIG. 3 is a diagram similar to FIG. 1, but according to a third embodiment of the present invention.

FIG. 3 schematically depicts an AFM according to a third embodiment of the present invention.

The amount of deflection of the cantilever 6 was detected by the use of the principle of the optical beam deflection. A zinc oxide whisker 13 which was prepared by vapor deposition was used as a probing tip. Because this whisker has a three-dimensional structure in the form of a tetrapod and has four projections extending from the center of a regular tetrahedron towards respective vertexes, it could be very easily bonded to the cantilever 6 using a bonding material. A grating having a pitch of 1 μm and a height of 0.5 μm was observed using this cantilever.

A grating 15 was initially placed, as a sample, on the sample platform 4 such that a central portion of the grating 15 might be positioned below the probing tip 13. Prior to measurements of this sample 15, the distance between the sample 15 and the probing tip 13 was controlled so that the magnitude of the repulsive force might become equal to $1\times10^{-8}$N by the operation of the third piezoelectric member 3 and a control signal generator 14 operatively connected to the photodiode 9. A control voltage applied to the third piezoelectric member 3 at this moment was stored in the computer 10. Undulation information at each point on the substrate surface was derived from this control voltage. Thereafter, a step voltage generated by the computer 10 was added to the control voltage by an adder 16 operatively connected to the control signal generator 14 and to the computer 10. By doing so, the sample 15 was moved 1 μm away from the probing tip 13. The sample 15 was then horizontally moved 20 nm by the first piezoelectric member 1 using the piezoelectric member drive unit 11. Thereafter, the sample 15 was brought near the probing tip 13 by gradually reducing the voltage added to the control voltage. After the sample 15 was moved 1 μm towards the probing tip 13, the control voltage required to generate a repulsive force of $1\times10^{-8}$N again was stored in the computer 10. During such measurements, the period of time during which the sample 15 was away from the probing tip 13 was set to 0.1 millisecond, whereas the speed of response of the control signal generator 14 was set to 1 millisecond. Furthermore, the period of time required for the movement between two adjoining points was set to 2 millisecond. Accordingly, no problem arose that the control by the control signal generator 14 followed the movement of the sample 15 away from the probing tip 13. Such measurements were repeated 256 times in the direction of X until the scanning for one line was terminated. Thereafter, the sample 15 was moved 20 nm by the second piezoelectric member 2, and similar operations were performed with respect thereto to complete the next succeeding line scanning. Upon completion of 256 line scannings, (256× 256) pieces of undulation information were obtained from the sample surface.

The use of the conventional AFM employing this cantilever, wherein the sample surface was continuously scanned under the influence of a constant repulsive force, could not provide reliable measurements or sometimes brought about damage of the whisker. The AFM according to the present invention, however, could provide a reliable image having a faithfully reproduced surface configuration, even in bottom configuration of grooves of the sample.

In the above-described embodiment, although explanation was made with respect to the AFM employing the zinc oxide whisker, a whisker crystal of tin oxide, silicon carbide, alumina, a metal, or an organic material such as, for example, phthalocyanine could be used in place thereof. The AFM according to the present invention employing such whisker crystal could provide an AFM image faithful to reproduce the surface configuration of a sample, even if the sample contained grooves having generally vertical side walls.

Figure 4:
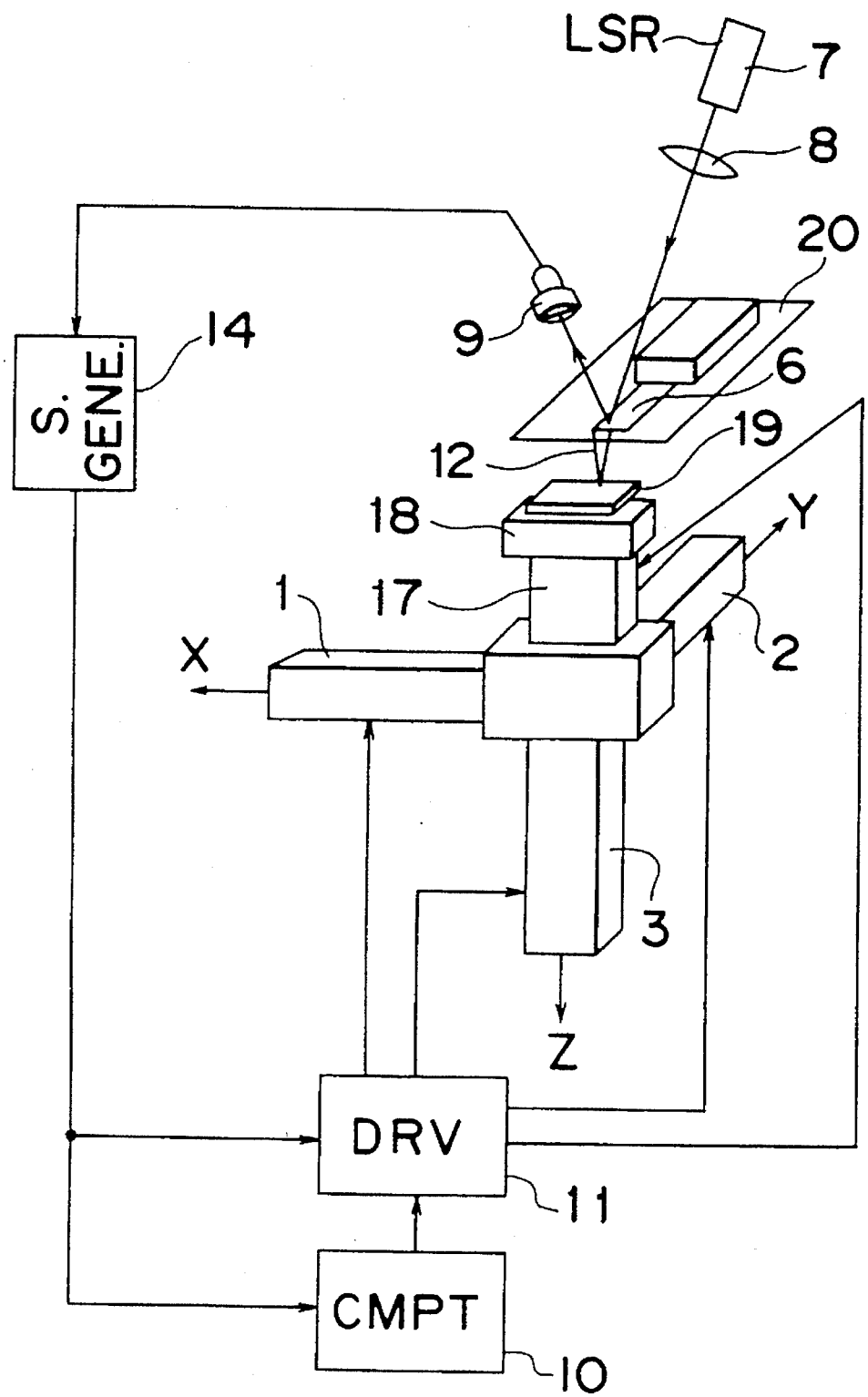
FIG. 4 is a diagram similar to FIG. 1, but according to a fourth embodiment of the present invention.
Figure 5:
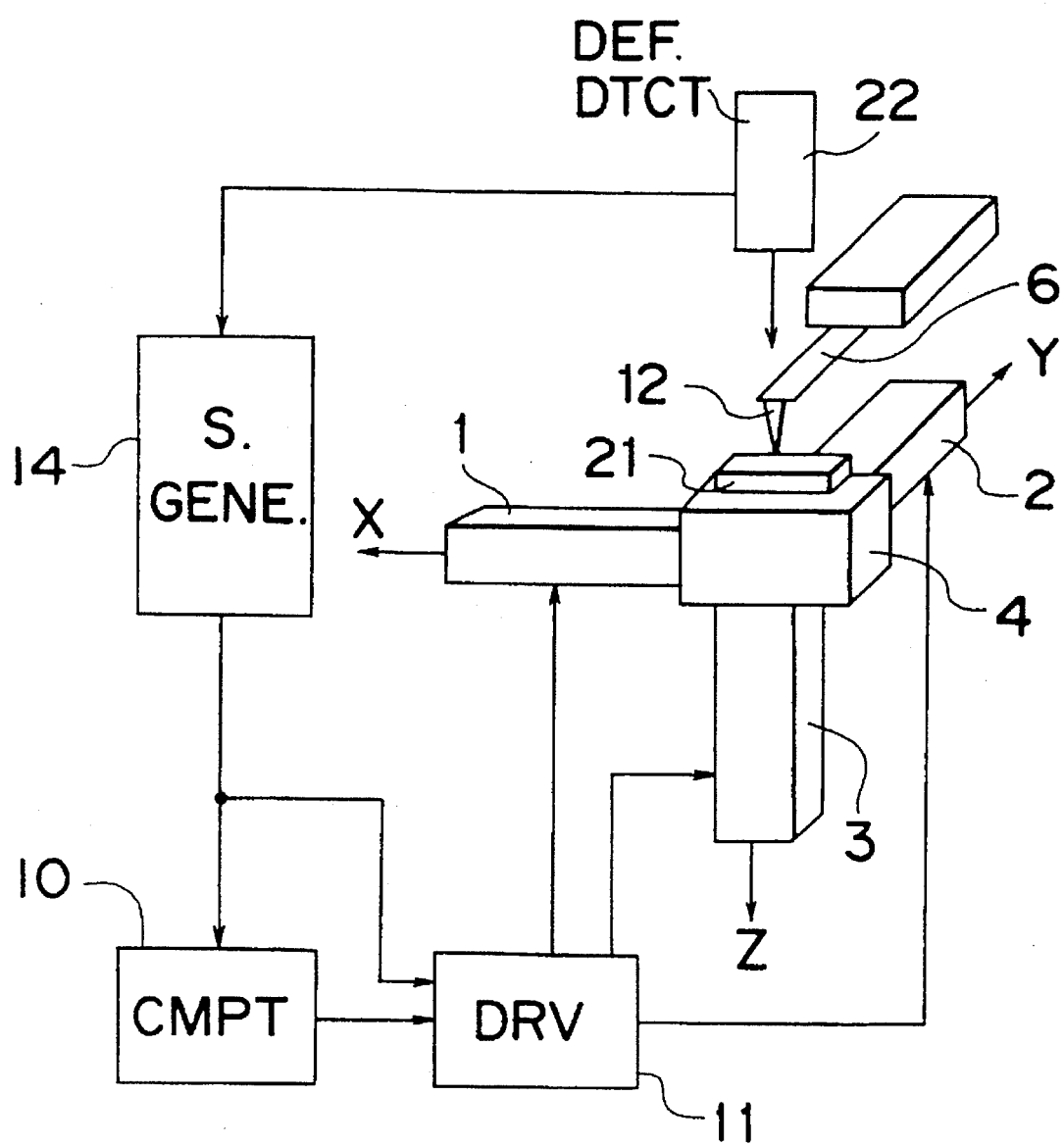
FIG. 5 is a schematic diagram of a conventional atomic force microscope (already referred to).

FIG. 4 schematically depicts an AFM according to a fourth embodiment of the present invention.

The AFM shown in FIG. 4 comprises a finely movable mechanism in the form of a tripod having three piezoelectric members 1, 2, and 3, a fourth piezoelectric member 17 secured to and extending from the finely movable mechanism in a direction opposite to the direction in which the third piezoelectric member 3 extends, and a sample platform 18 placed on the fourth piezoelectric member 17. The fourth piezoelectric member 17 was provided for moving a sample 19 from the probing tip 12.

A specific control method is explained hereinafter which was used to observe flagella of Salmonella bacteria.

A flagella sample 19 was initially placed on the sample platform 18 such that a central portion of the former might be positioned below the probing tip 12. Measurements of this sample were performed in a water pool pipetted so as to be trapped between the sample 19 and a glass plate 20 positioned above the cantilever 6. The distance between the sample 19 and the probing tip 12 was controlled by the control signal generator 14 and the third piezoelectric member 3 so that the repulsive force might become equal to $1\times10^{-9}$N. The control voltage applied to the third piezoelectric member 3 at this moment was stored in the computer 10. Undulation information at each point on the sample surface was derived from this voltage value. Thereafter, the sample 19 was moved 50 nm away from the probing tip 12 by applying a step voltage Vz generated by the computer 10 to the third piezoelectric member 3. The sample 19 was then moved 3 nm by the first piezoelectric member 1 using the piezoelectric member drive unit 11. Thereafter, the voltage applied to the third piezoelectric member 3 was gradually reduced to bring the sample 19 near the probing tip 12. After the sample 19 was moved 50 nm towards the probing tip 12, a control voltage required for controlling the repulsive force to become $1\times10^{-9}$N again was stored in the computer 10. Such measurements were repeated 256 times in the direction of X until the scanning for one line was terminated. Thereafter, the sample 19 was moved 3 nm by the second piezoelectric member 2, and similar operations were performed with respect thereto to complete the next succeeding line scanning. Upon completion of 256 line scannings, (256×256) pieces of undulation information were obtained from the sample surface. Several flagella each having a diameter of about 20 nm and a length of more than 100 nm were observed from an AFM image obtained from such information.

According to the AFM as discussed hereinabove, even if flagella which could not be anchored on a substrate were used as a sample, it was recognized that the probing tip did not drag the sample during scanning, and hence, an accurate AFM image could be obtained.

In this embodiment, although the fourth piezoelectric member 17 for moving the sample away from the probing tip was interposed between the sample and the finely movable mechanism, this member 17 could be arranged on the cantilever side. In this case, the resonant frequency thereof was increased, thereby enabling high-speed AFM measurements.

It is to be noted here that, in each of the first to fourth embodiments discussed above, although the sample was moved by the finely movable mechanism in three different directions, the sample may be maintained stationary. In this case, all of the cantilever 6, the laser diode 7, the lens 8, the photodiode 9, and the like should be assembled into one unit so that the unit can be moved by a finely movable mechanism similar to that discussed above or any other suitable means.

It is also to be noted that the amount of movement of one of the sample and the probing tip towards or away from the other is so chosen as to be greater than a maximum value of height variations of the sample surface at least within a range thereof to be measured.

As is clear from the above, the AFM according to the present invention can stably accurately measure extremely small height variations of less than 0.1 nm at a reduced noise level. Furthermore, in measuring a grating having relatively deep grooves or a sample having generally vertically extending side walls, the cantilever or the probing tip is free from damage. Even if a microorganism which cannot be anchored on a substrate is used as a sample, measurements can be carried out with reliability without dragging the living sample by the probing tip. As a result, a highly accurate AFM image can be obtained at a high resolution.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of measuring a surface profile of a sample using an atomic force microscope which observes a sample surface by making use of forces acting between a probing tip formed on a free end of a cantilever and the sample surface when the probing tip is brought into contact with the sample surface, said method comprising the steps of:

(a) positioning the probing tip above one location of the sample surface;

(b) moving one of the cantilever and the sample surface towards the other by a constant given distance so that the probing tip is brought into contact with the sample surface, said constant given distance being determined in advance so as to be greater than a maximum value of height variations of the sample surface within a range thereof to be measured;

(c) measuring a height of the sample surface with the probing tip held in contact with the sample surface;

(d) imaging said height measured at step (c);

(e) moving said one of the cantilever and the sample surface away from the other by said given distance so that the probing tip is spaced apart from the sample surface;

(f) moving said one of the cantilever and the sample surface relative to the other so that the probing tip is positioned above a next adjacent location of the sample surface spaced apart from said one location;

(g) repeating said steps (b) to (f) at a plurality of succeeding locations of the sample surface so as to image the height variations of the sample surface.

2. The method according to claim 1, wherein the height variations of the sample surface are imaged based on the amount of deflection of the cantilever when the probing tip is held in contact with the sample surface.

3. The method according to claim 2, wherein said probing tip comprises an acicular projection formed on the free end of the cantilever.

4. The method according to claim 3, wherein said acicular projection is a whisker crystal of a material selected from the group consisting of a metal, zinc oxide, tin oxide, silicon carbide and an organic material.

5. The method according to claim 1, and further comprising, after step (b), the step of controlling the position of said one of the cantilever and the sample surface relative to the other so that the amount of deflection of the cantilever becomes equal to a constant given value, wherein the height variations of the sample surface are imaged based on a control quantity required to render the amount of deflection of the cantilever to be said constant given value.

6. The method according to claim 5, wherein said one of the cantilever and the sample surface is moved relative to the other by a plurality of piezoelectric members.

7. The method according to claim 6, wherein a voltage required to move said one of the cantilever and the sample surface towards and away from the other is applied to one of the plurality of piezoelectric members, and a control voltage required to render the amount of deflection of the cantilever to be said constant given value is applied to said one of the plurality of piezoelectric members.

8. The method according to claim 6, wherein a voltage required to move said one of the cantilever and the sample surface towards and away from the other is applied to one of the plurality of piezoelectric members, and a control voltage required to render the amount of deflection of the cantilever to be said constant given value is applied to another piezoelectric member different from said one of the plurality of piezoelectric members.

9. The method according to claim 5, wherein said probing tip comprises an acicular projection formed on the free end of the cantilever.

10. The method according to claim 9, wherein said acicular projection is a whisker crystal of a material selected from the group consisting of a metal, zinc oxide, tin oxide, silicon carbide and an organic material.

\* \* \* \* \*